United States Patent
Malur et al.

(10) Patent No.: US 8,386,372 B2
(45) Date of Patent: Feb. 26, 2013

(54) SYSTEM, METHOD AND COMPUTER PROGRAM PRODUCT FOR COMPILING GOLDEN COPY OF SECURITIES PRICING

(75) Inventors: Ranganath Malur, Green Brook, NJ (US); Hiren Sheth, West Windsor, NJ (US); Rajan Dawar, Princeton, NJ (US)

(73) Assignee: American International Group, Inc., New York, NY (US)

( * ) Notice: Subject to any disclaimer, the term of this patent is extended or adjusted under 35 U.S.C. 154(b) by 0 days.

(21) Appl. No.: 13/206,889

(22) Filed: Aug. 10, 2011

(65) Prior Publication Data

US 2012/0041863 A1 Feb. 16, 2012

Related U.S. Application Data

(60) Provisional application No. 61/372,660, filed on Aug. 11, 2010.

(51) Int. Cl.
*G06Q 40/00* (2012.01)
(52) U.S. Cl. .............. 705/37; 705/36; 705/38; 705/52; 705/54; 235/38; 345/745; 713/153; 463/25
(58) Field of Classification Search .............. 705/35, 705/36, 38, 52, 54; 235/38; 345/745; 713/153; 463/25
See application file for complete search history.

(56) References Cited

U.S. PATENT DOCUMENTS

| | | |
|---|---|---|
| 6,236,980 B1 | 5/2001 | Reese |
| 6,772,146 B2 | 8/2004 | Khemlani et al. |
| 7,310,615 B2 | 12/2007 | Lewis |
| 7,650,367 B2 | 1/2010 | Arruza |
| 7,653,647 B2 | 1/2010 | Borthakur et al. |
| 2006/0015425 A1 | 1/2006 | Brooks |
| 2007/0106578 A1 | 5/2007 | Knigge |
| 2007/0129960 A1 | 6/2007 | Farrell |
| 2009/0063310 A1 | 3/2009 | Alonzo et al. |

OTHER PUBLICATIONS

International Searching Authority, International search report and written opinion relative to cognate PCT international patent application No. PCT/US2011/047081, dated Nov. 15, 2011.

*Primary Examiner* — Tien Nguyen
(74) *Attorney, Agent, or Firm* — Leydig, Voit & Mayer, Ltd (57) ABSTRACT

Systems, methods, and computer program products include a golden copy application for compiling golden copies of securities pricing according to a set of securities rules established by a subscriber that can be used in a computing environment and embodied in computer readable media. Disclosed embodiments of a golden copy application can compile each subscriber's golden copy in accordance with specific rules defined by the subscriber relative to which information source should be used for different asset classes. Each subscriber can identify more than one information source for each asset class, and rank those sources in order of desirability.

24 Claims, 5 Drawing Sheets

SYSTEM, METHOD AND COMPUTER PROGRAM PRODUCT FOR COMPILING GOLDEN COPY OF SECURITIES PRICING

CROSS REFERENCE TO RELATED APPLICATIONS

This patent application claims the benefit of U.S. Provisional Patent Application No. 61/372,660, filed Aug. 11, 2010, which is incorporated herein in its entirety by this reference.

BACKGROUND OF THE INVENTION

Current, daily pricing for negotiable securities available in the world markets is typically commercially available from various reporting agencies, such as Bloomberg, Thomson Reuters, Interactive Data Corporation, and others. Reporting agencies typically collect information from various markets around the world and compile aggregate pricing lists that they typically make available to the public for a fee. Financial institutions use such pricing lists to value their assets, as well as the assets of their customers, on a daily basis.

The nature of the pricing information collected from the world markets causes the various pricing lists that are available to contain differences in the listed prices for a given security. These differences are attributable to time differences in acquiring the pricing information and foreign exchange rate fluctuations throughout the day. Thus, the same security when valued at a foreign currency rate at different times of the day, by different agencies, is likely to have a different price depending on when it is priced.

An entity interested in valuing a particular asset may prefer securities pricing information from specific vendors, depending on the location of the valuing entity and/or the asset being valued, the type of asset being valued, and the currency in which the asset is priced. For a securities management or other financial organization, the compilation of "golden copy" reports of price lists for securities for internal use as well as for dissemination to other entities on a global scale is a labor intensive and expensive process. The golden copy price list of a set of securities is a designated, master version of the price list for the set of securities at a given time.

The concept of the "golden copy" of reference data involves creating a trusted set of data for all aspects of operation within an organization. A golden copy is also necessary to conform with regulatory reporting that is required for financial organizations. However, there are numerous challenges for a service provider in creating a trusted golden copy for each member of its global subscriber base. For example, there is no single source of all the required data because data originates from both domestic and foreign sources. Additionally, each subscriber's organization is interested in satisfying its own policies, procedures, asset mix and relationships, each of which makes each subscriber's requirements unique. Further, data acquired from internal and external sources for compiling the golden copy for a particular subscriber are not static, thus certain information included in the golden copy becomes stale quickly if not continuously refreshed.

SUMMARY OF THE INVENTION

In accordance with the teachings provided herein, systems, methods, and computer program products for compiling golden copies of securities pricing are provided. For example, a golden copy application for compiling golden copies of securities pricing according to a set of securities rules established by a subscriber can be used in a computing environment and can be embodied in computer readable media bearing instructions for compiling a golden copy of securities pricing.

Embodiments of a system and a method for automatically and reliably compiling golden copies of securities pricing information for multiple subscribers are disclosed. Disclosed embodiments of a golden copy application can compile each subscriber's golden copy in accordance with specific rules defined by the subscriber relative to which information source should be used for different asset classes. Each subscriber can identify more than one information source for each asset class, and rank those sources in order of desirability such that the golden copy is more likely to include prices for all securities listed thereon even if the primary information source identified by the subscriber for a particular asset class is unable to provide a price. Data collection and processing operations can be performed automatically, thereby reducing the time and cost of creating the specified golden copy. An additional advantage of the pricing systems and methods disclosed herein are their flexibility in creating fully-customized golden copies for subscribers located around the world.

In one aspect, the present disclosure describes a system for compiling securities pricing information that includes a physical computer-readable medium including a securities pricing application having computer-executable instructions for compiling securities pricing information, a securities pricing processor adapted to execute the instructions for compiling securities pricing information contained on the physical computer-readable medium, and a data storage device containing securities pricing information and operably arranged with the securities pricing processor. Securities pricing information in the storage device is accessible to the securities pricing processor and is modifiable by the securities pricing processor.

The securities pricing application includes a plurality of modules. A subscriber securities list module is adapted to receive from a subscriber a list of securities of interest. A subscriber rule set module is adapted to receive from the subscriber a rule set including at least one pricing rule relating to the securities of interest. A security pricing collection module is adapted to collect security pricing information using an information management interface operably connected to a security pricing information source. A security pricing storage module is adapted to store the security pricing information in the data storage device. A security pricing report compilation module is adapted to compile from the security pricing information a pricing report for the list of securities using the rule set from the subscriber.

In another aspect, the disclosure describes a method for compiling securities pricing information. A processor is operably arranged with a data storage device and a communication channel. The processor is employed to execute computer executable instructions stored on a tangible computer-readable medium to implement the following steps. A list of securities of interest is received from a subscriber. A rule set including at least one pricing rule relating to the securities of interest is received from a subscriber. Security pricing information is collected through the communication channel from a security pricing data feed of a security pricing information source. Security pricing information from the security pricing data feed is stored in the data storage device. A pricing report for the list of securities is compiled from the security pricing information using the rule set from the subscriber.

In yet another aspect, the disclosure describes a non-transitory, tangible computer-readable storage medium storing a program for compiling securities pricing information that, when executing on one or more computing devices, performs the following steps. A list of securities of interest is received from a subscriber. A rule set including at least one pricing rule relating to the securities of interest is received from the subscriber. Security pricing information is collected from a security pricing data feed of a security pricing information source. Security pricing information from the security pricing data feed is stored in a data storage device. A pricing report for the list of securities is compiled from the security pricing information using the rule set from the subscriber.

As will be appreciated, the systems, methods, and computer program products disclosed herein are capable of being carried out in other and different embodiments, and capable of being modified in various respects. Accordingly, it is to be understood that both the foregoing general description and the following detailed description are exemplary and explanatory only and are not restrictive of the invention as claimed.

DETAILED DESCRIPTION OF EMBODIMENTS OF THE INVENTION

As described briefly above, various embodiments of systems, methods, and computer program products for compiling golden copies of securities pricing are provided herein. In the following detailed description, references are made to the accompanying drawings that form a part hereof, and in which are shown by way of illustration, specific embodiments or examples. These embodiments may be combined, other embodiments may be utilized, and various changes may be made without departing from the spirit or scope of the present invention. The following detailed description is therefore not to be taken in a limiting sense, and the scope of the present invention is defined by the appended claims and their equivalents.

Embodiments of a golden copy security pricing application are provided to implement rules-based instructions from a subscriber to compile a golden copy of securities pricing for a list of securities selected by the subscriber. The golden copy security pricing application can be included as part of various embodiments of a method for compiling golden copy securities pricing, a system for compiling golden copy securities pricing, and a non-transitory, tangible computer-readable storage medium bearing instructions for compiling golden copy securities pricing.

The present disclosure provides a customizable golden copy of securities pricing that can be tailored to the specific requirements of each subscribing customer or entity. The disclosed golden copy security pricing application can be adapted to provide a daily "golden copy" or master pricing list to subscribers of the service. The master list is customizable by each user and compiled based on pricing information provided by selected sources including multiple reporting agencies for multiple asset classes or even for individual securities according to a set of rules established by each subscriber. The system further includes built-in price rationality checks and contingency measures to ensure that the securities pricing provided to the users of the service is complete and verified.

Figure 1:
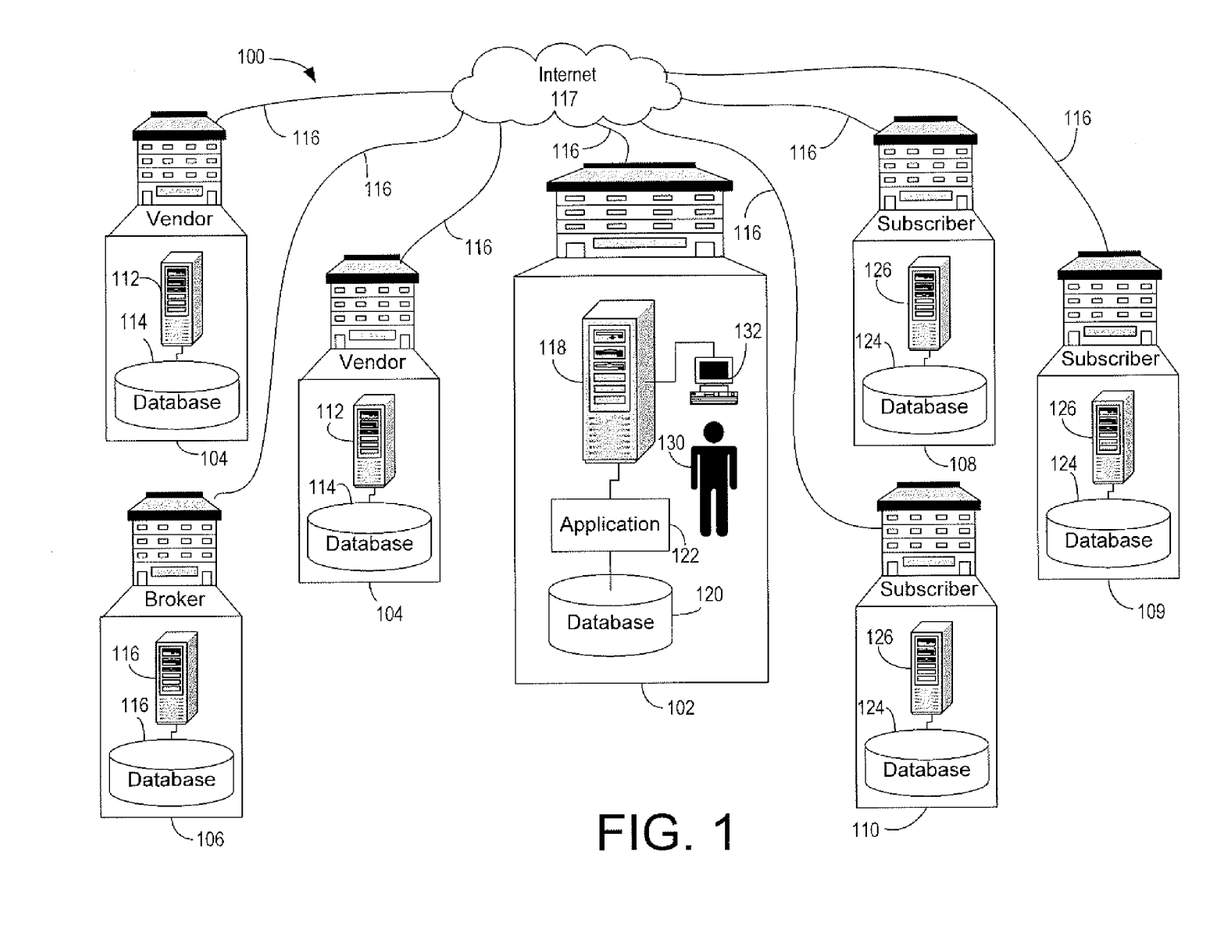
FIG. 1 is a schematic diagram of an embodiment of a computer-implemented system for compiling golden copy securities pricing.

Turning now to the Figures, there is shown in FIG. 1 an embodiment of a system 100 for compiling securities pricing information in accordance with the principles of the present disclosure. The system 100 includes a service provider 102 that collects and processes security pricing information from various vendors 104, brokers 106, and other sources. The information compiled is processed based on the individual requirements of each of a number of subscribers 108, 109, 110 of the service provider 102, and a customized golden copy of securities pricing is provided to each subscriber 108, 109, 110.

More specifically, the vendors and brokers 104 and 106 represent news agencies, such as Bloomberg, Thomson Reuters, Interactive Data Corporation, and so forth, and data aggregators, such as Citibank®, Merrill Lynch, and others, that collect and report securities pricing information. Such pricing information is collected from secondary trading markets around the world and is published by the vendors 104 and the brokers 106 or is otherwise made available to the public. Typically, pricing information for individual securities is provided to a requestor for a fee, and is made available using electronic media, such as via the Internet.

To accomplish this, each vendor 104 or broker 106 operates a computer system that acts as a collector and repository of pricing information. The computer system may include a server 112 that is communicatively connected to a database 114. The server 112 of each entity 104, 106 can track pricing information for various securities on a real-time basis, and store this information in its respective database 114. The up-to-date pricing information typically further includes foreign exchange (FX) rates, factor pricing, and other financial information, and is aggregated by the vendors 104 and the brokers 106 from various capital markets around the world. Depending on the geographical location, market, or other circumstances, each vendor 104 or broker 106 may compile and publish a comprehensive list of securities pricing, FX rates, factor pricing, and/or other financial information at the end of the day. These lists are accessible by the service provider 102 via electronic communication channels 116, for example, established through a network, such as the Internet 117 or other suitable mechanism.

The service provider 102 includes computer systems, such as a processor 118 and a database 120, that selectively access, collect, process, store, and publish information according to the executing instructions of a securities pricing application 122 operated by the server 118. In the illustrated embodiment, the application 122 is a collection of computer executable instructions that is operating by the server 118 and that is able to store and retrieve information from the database 120. Further, the application 122 is arranged to selectively open and terminate communication links 116 with the servers 112 and databases 114, as appropriate, of the vendors 104 and the brokers 106 via the electronic communication channels 116.

Specific requests for pricing information are provided to the service provider 102 by the subscribers 108, 109, 110.

These requests, which are also known as securities of interest (SOI), can include securities, FX rates, factor pricing, and other pricing information each subscriber is interested in receiving. Thus, each subscriber can compile a list of assets and other financial information it desires for example, on a daily basis, by use of a database 124 that is communicatively connected to a server 126. The list of information used to compile each subscriber's 108 golden copy by the service provider 102 is communicated to the service provider 102 electronically via appropriate communication channels 116 through the Internet 117, for example.

In the illustrated embodiment, the service provider 102 maintains accounts on its computing environment for the subscribers 108, 109, 110 who are able to remotely access the server 118 via the communication channels 116 and upload their lists, pricing rules used to establish, for example, from what source pricing information is to be used to compile the subscriber's golden copy, and other information to the database 120 of the service provider 102 as well as download their specific golden copy into their respective databases 124. When the application 122 is executed, it draws the specific requests for information for each subscriber 108, 109, 110 from the database 120, and generates the appropriate requests for pricing for the vendors 104 and the brokers 106. Information provided from the vendors 104 and the brokers 106 is processed according to specific sets of rules that have been provided by the subscribers 108, 109, 110 and integrated with the application 122, and a golden copy of a price list is created for each subscriber 108, 109, 110. Thereafter, after certain checks have been performed, the golden list corresponding to each subscriber 108, 109, 110 is sent its recipients via the communication channels 116.

Rationality checking of the accuracy of pricing information received from the vendors 104 and the brokers 106 is performed on multiple levels before the pricing information is deemed dependable and used in the golden copies sent to subscribers 108, 109, 110. For example, the application 122 may compare the price it receives for a given security from one of the vendors 104 and the brokers 106 to a last known price for the security as it exists in the database 120, and flag prices that vary from a last known price by more than a threshold value. Any prices thus flagged are considered suspect and are compiled in a list of exceptions, which can be provided to an analyst 130 via a terminal 132 that communicates with the processor 118. The analyst 130 may review and verify each of the items of the exception list, and approve or reject each before the golden copies are finalized and sent to the subscribers 108, 109, 110.

The system can include at least one input device operatively connected to at least one processor, at least one output device operatively connected to at least one processor, an internal network operatively connected to at least one processor, and an external network operatively connected to at least one processor.

Figure 2:
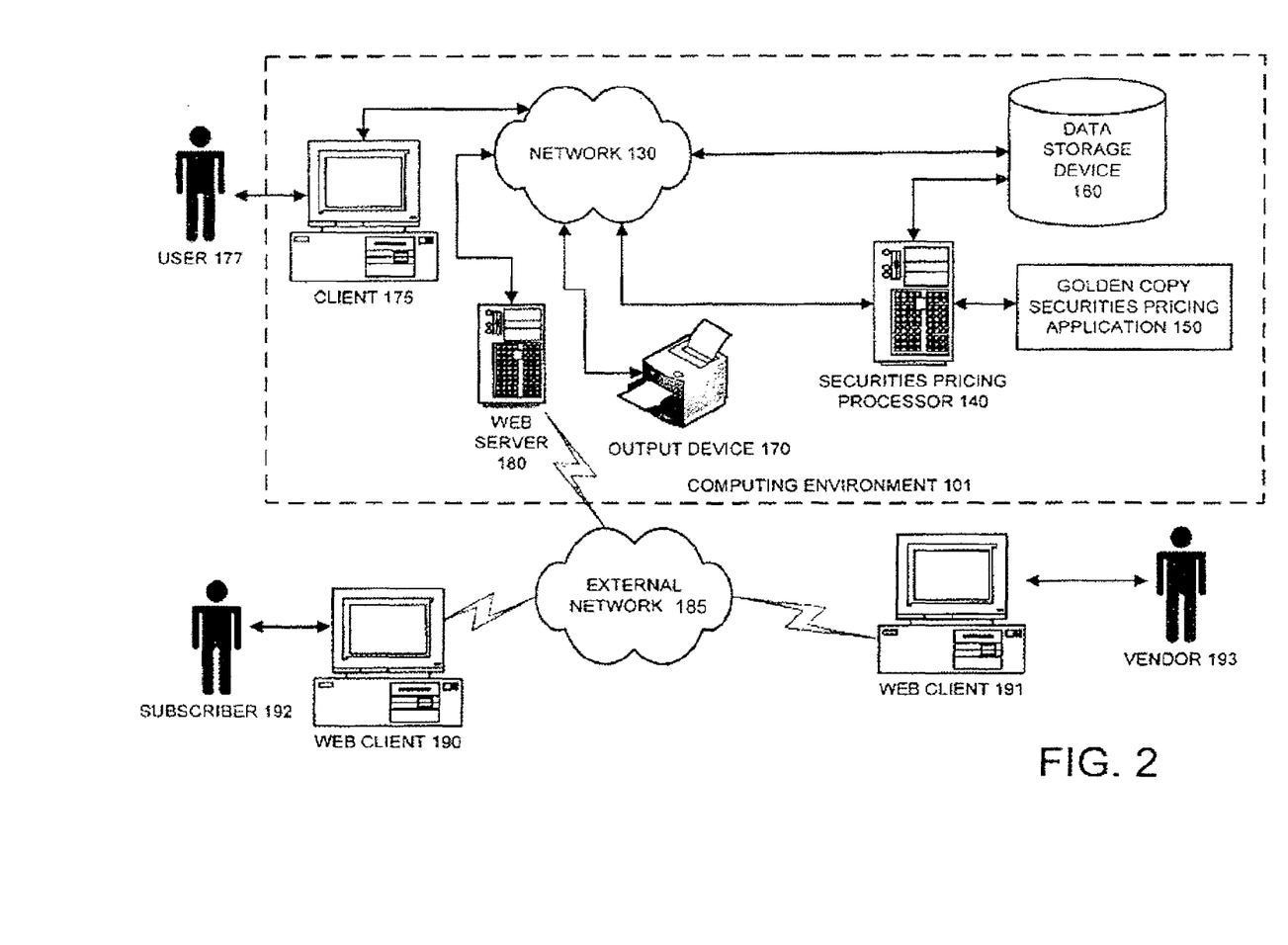
FIG. 2 is a schematic diagram of an embodiment of a computer-implemented system having a physical computer program product including computer-executable instructions for compiling golden copy securities pricing.

Referring to FIG. 2, an embodiment of a computing environment 101 for compiling golden copy securities pricing is shown. A web server 180 can provide access to an internet-based web platform that includes a golden copy securities pricing application 150. The web platform is a centralized, front-end application for subscribers to enter and send lists of SOIs and subscriber rules into the golden copy securities pricing application 150 and for vendors and brokers to send security pricing data feeds into the golden copy securities pricing application 150. The web platform can periodically send golden copy securities pricing data and reports to a subscriber according to the set of pricing rules the subscriber established in the golden copy securities pricing application 150.

The computing environment 101 can include a number of computer systems, which generally can include any type of computer system based on: a microprocessor, a mainframe computer, a digital signal processor, a portable computing device, a personal organizer, a device controller, or a computational engine within an appliance. More specifically, the computing environment 101 can include an internal network 130, a securities pricing processor 140 operating a golden copy securities pricing application 150, a database 160, an output device 170, and a web server 180 operatively connected to an external network 185, which is connected to web clients 190 and 191. The securities pricing processor 140, the databases 160, the output device 170, the web server 180, and the clients 190 and 191 are operatively connected together directly or indirectly via the internal network 130.

A plurality of subscribers 192 can use the computing environment 101 to access the golden copy securities pricing application 150 to enter subscriber lists of SOIs and securities rules maintained by the golden copy securities pricing application 150 in the database 160 via web clients 190. Alternatively, subscribers may access the pricing application 150 from within the computing environment 101. A plurality of vendors 193 can use the computing environment 101 to access the golden copy securities pricing application 150 to transmit securities pricing data feeds for use by the securities pricing application 150 via web clients 191. In other embodiments, a different communication channel can be established between the brokers, vendors, etc. and the golden copy securities pricing application 150 to transmit security pricing data feeds to the securities pricing application 150.

The network 130 can generally include any type of wired or wireless communication channel capable of coupling together computing nodes. Examples of a suitable network 130 include, but are not limited to, a local area network, a wide area network, or a combination of networks.

The securities pricing processor 140 can generally include any computational node including a mechanism for servicing requests from a client for computational resources, data storage resources, or a combination of computational and data storage resources. Furthermore, the securities pricing processor 140 can generally include any system that can be adapted to allow for the selective transmission of golden copy securities pricing to a subscriber according to the subscriber's set of rules. The securities pricing processor 140 can generally include any component of an application that can receive input from the web users 190, 191, process the input, and present the output to the golden copy securities pricing application 150, the web server 180, and/or the database 160. The securities pricing processor 140 can generally include any component of an application that can process data, interact with the database 160, and execute business logic for the administration of the delivery of golden copy securities pricing data and reports desired by each subscriber.

The golden copy securities pricing application 150 comprises a computer program product residing on a computer readable medium having a plurality of instructions stored thereon which, when executed by the securities pricing processor 140, cause the processor 140 to perform steps associated with generating a golden copy of securities pricing for a list of SOIs according to a rule set of a subscriber as described herein. Any suitable computer-readable storage medium can be utilized, including, for example, hard drives, floppy disks, CD-ROM drives, tape drives, zip drives, flash drives, optical storage devices, magnetic storage devices, and the like.

The database or data storage device 160 can generally include any type of system for storing data in non-volatile storage. This includes, but is not limited to, systems based upon: magnetic, optical, and magneto-optical storage devices, as well as storage devices based on flash memory and/or battery-backed up memory.

In one embodiment, the database 160 contains information relating to the subscriber rules. This information can be used by the golden copy securities pricing application 150 to periodically compile golden copies of securities pricing according to the set of rules established by each subscriber.

The output device 170 can comprise a printer, a display monitor, and a connection to another device, for example. The output device 170 can be used to generate reports for sending golden copies of securities pricing to the subscribers 192. The output device 170 can also be used to generate exception reports that include a listing of any security pricing information missing from a security pricing report but found in the list of securities or specified in the rule set from the subscriber.

The client 175 can be used by an authorized user 177 to help administer the golden copy securities pricing application 150. The client 175 can generally include any node on a network including computational capability and including a mechanism for communicating across the network 130. In one embodiment, the client 175 hosts an application front-end of the golden copy securities pricing application 150. The application front-end can generally include any component of the golden copy securities pricing application 150 that can receive input from the user 177 or the client 175, communicate the input to the application, receive output from the application, and present the output to the user 177 or the client 175. In one embodiment, the application front-end can be a stand-alone system. The data storage device 160 can contain a permission database which stores user credentials and permissions specific to each user 177.

A report engine can be provided to generate displays of information stored in the database 160 concerning the securities pricing selected by each subscriber, which can be viewed using the output device 170, for example. In one embodiment, the report engine further provides pre-configured and/or ad hoc reports relating to the securities pricing selected by each subscriber.

The web server 180 can provide a suitable web site or other Internet-based graphical user interface which is accessible by the subscribers 192 and the vendors 193 providing security pricing data feeds, for example. The web clients 190 and 191 can be connected to the web server 180 through an external network connection 185 (e.g., Internet, Intranet, LAN, WAN and the like). The web server 180 can use an authentication server in order to validate and assign proper permissions to authorized users of the system. A permission database can store web user credentials and permissions specific to each subscriber, vendor, broker, etc. The web server 180 can be outfitted with a firewall such that requests originating from outside the computing environment pass through the firewall before being received and processed at the web server 180.

In addition to the components discussed above, the computing environment 101 can further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

Figure 3:
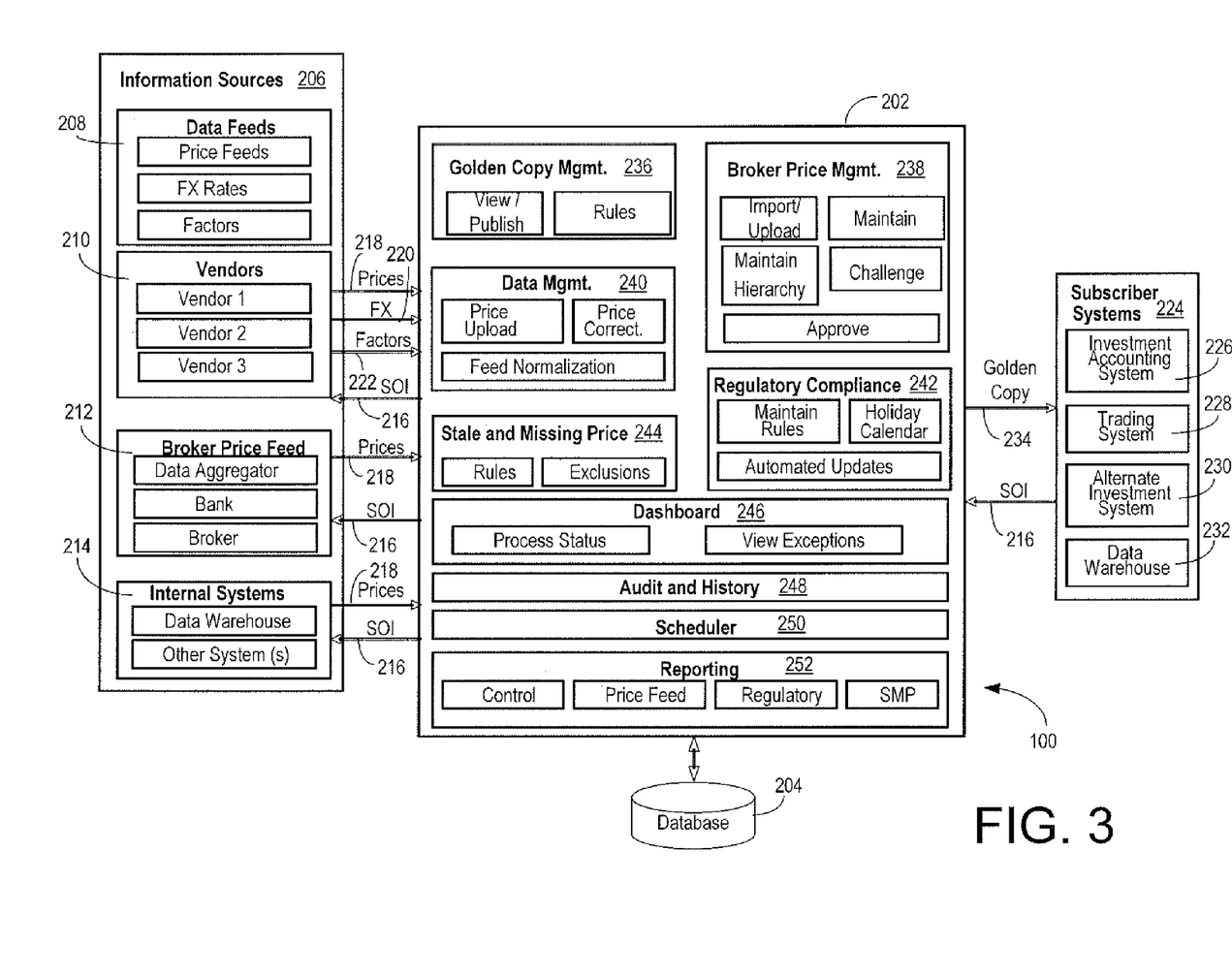
FIG. 3 is a functional diagram of an embodiment of a computer-implemented system for compiling golden copy securities pricing.

A functional diagram of the pricing system 100 showing the various internal components thereof and the connections with external sources for exchange of information is shown in FIG. 3. As shown, the pricing system 100 includes an information management interface 202 that is connected to and arranged to exchange information with a database 204. The database 204 may be a main database of the service provider, such as the database 120 as shown in FIG. 1, or it may alternatively be a dedicated database residing in a regional office.

The information management interface 202 includes the functionality previously described relative to the application 122. Thus, it is arranged to exchange information with information sources 206, such as data feed services 208, vendors 210, and brokers 212, as well as internal sources, such as various internal systems 214 that include data warehouses and other systems internally maintained within an organization. The information management interface 202 essentially provides a listing of its securities of interest (SOIs) 216 to the vendors 210 and the brokers 212, and receives, in response, the pricing information 218 for each of the SOIs 216 as well as information about FX rates 220 and factor pricing 222. It should be appreciated that pricing information for certain SOIs 216 can be available from various vendors 210 as well as brokers 212, which include data aggregation services, banks, and others. Present or past pricing information used, for example, for performing rationality checks on the pricing information received from external sources, is provided by the internal systems 214 that contain pricing information archives.

The list of the SOIs 216 is provided to the information management interface 202 by the subscribers 224. Each subscriber 224 may maintain its own internal systems for managing assets. Thus, a subscriber 224 may draw on its internal investment accounting system 226, trading system 228, alternative investment system 230, data warehouse 232, and other internal systems to compile its most up to date list of SOIs for which pricing information is desired. For example, the subscriber 224 wishing to evaluate its assets on a daily basis may interrogate its internal systems for their holding positions and, based on that information, compile the list of SOIs. This list of SOIs will ultimately be populated with pricing information and become the golden copy 234 of pricing that is received back from the information management interface 202.

As shown in FIG. 3, the information management interface 202 includes several functional areas that are dedicated to performing specific tasks. Each of these functional areas comprises a specific collection of computer-executable instructions providing a specific function, and is arranged in modular fashion for use when a specific function is desired. In other words, certain functional areas shown and described relative to the information management interface shown in FIG. 3 are optional and can be omitted, as is described in more detail below. The various functional areas represented can also be considered as functions of the information management interface 202 that can be accessed by the subscribers to input and/or retrieve information that is specific to each subscriber.

The information management interface 202 includes a golden copy management module 236. The golden copy management module 236 is a user interface that allows each subscriber to retrieve current or previously-generated golden copies of pricing data and reports. Further, this module permits a subscriber to view, update, and/or change the specific "Rules" used by the pricing system to generate the golden copies based on the SOIs provided.

The word "Rules" as used herein represents one or more sets of pricing rules for securities that are followed when compiling the golden copy for each subscriber. Such rules are typically specified by each subscriber and dictate the desired source of pricing information for each class of asset in the subscriber's list of SOIs. The Rules can further provide the preferred order in which sources of information should be interrogated in the event that the preferred source is unable to provide the desired pricing information at the time of inquiry by the information management interface 202. The Rules can also specify the frequency at which a golden copy of pricing for the list of SOIs should be generated. The various Rules provided by a subscriber can correspond to a rule set for the golden copy of security pricing for the list of SOIs.

Each subscriber 224 may access the information management interface 202 and specify one or more desired sources of pricing information for each class of assets that may be listed on that subscriber's list of SOIs, and may further rank the one or more sources of information in order of preference. For example, a particular subscriber may designate one or more of the same or different information providers, such as Reuters, Bloomberg, and so forth, in a specific order for providing information on a particular asset class, for example, equities. That same subscriber may select one or more other information providers, specified in a unique order, for providing pricing information on another asset class, for example, fixed income, and so forth.

The pricing system 100 groups all rules provided by a specific subscriber or, alternatively, all rules that will be used when processing each specific list of SOIs to generate each golden copy, into individual rule sets. When processing the rule sets against corresponding lists of SOIs, the golden copy management module 236 can aggregate a master list of SOIs from all subscribers, solicit and receive price information for each security from the sources listed in the rule sets, and process the information received according to each rule set to create each golden copy. Each subscriber can access the most recent golden copy (and previous golden copies archived in the data storage device) through the information management interface 202.

The information management interface 202 further includes a broker price management module 238. The broker price management module 238 can be used to designate the sources of information the subscriber 224 desires to utilize and, further, to define individual rules for specific classes of assets by providing relative hierarchy of brokers or other information sources to make up each rule. More specifically, a subscriber 224 may import or upload a list of brokers or other information sources into the pricing system 100 using the broker price management module 238. The subscriber 224 can also define the hierarchy of interrogation of those information sources for each class of assets. Given that golden copies are generated periodically, for example, daily, the subscriber 224 can access the information management interface 202 and update or maintain the rules previously entered on an ongoing basis. At the end of each session, the subscriber 224 is asked to approve any new or changed information entered into the system. Approval of the information provided by the subscriber 224 validates the new or updated rules entered by the subscriber 224 for use in the creation of subsequent golden copies for that subscriber 224.

The information management interface 202 further includes a data management module 240. The data management module 240 is directly linked to the database 204 and operates to accept the lists of SOIs provided by each subscriber 224. In other words, each subscriber 224 signing onto the system may access its specific listing of SOIs and perform any updates or changes in advance of the creation of the next golden copy. Thus, subsequent golden copies created for the particular subscriber may be updated to exclude securities no longer held by a subscriber, or include new assets.

The data management module 240 may be further used to manually update, correct, or enter prices, for example, prices that the pricing system 100 could not automatically determine, for whatever reason, even after the hierarchy of information sources provided by the subscriber were interrogated, if more than one sources were identified. Additionally, the data management module 240 can normalize the stream of information compiled in each golden copy at the selection of the subscriber by, for example, expressing all prices in a preselected currency, or by sorting the list of SOIs in a particular order based on asset class, value, region, etc.

The information management interface 202 further includes a regulatory compliance module 242. Given that subscribers 224 may be located in various countries around the world and be subject to different regulatory reporting requirements, the pricing system 100 provides the optional functionality of affording each subscriber the capability of automating its regulatory compliance reporting by defining and maintaining on the system regulatory rules as apply to it. The system may be set up to periodically perform automatic updates of the relevant rules, and also keep track of holidays to avoid the expense of generating golden copies unnecessarily.

As previously described, the pricing rules defined by the subscribers may designate more than one sources for retrieving pricing information depending on the type of asset being priced. Although more than one source, which are ranked in order of preference, can be designated, it is possible that certain prices may be missing or may become stale when the final version of the golden copy has been compiled. A subscriber 224 using the pricing system 100 may define rules on how the subscriber 224 desires the system to address stale or missing prices by using a stale and missing price (SMP) module 244. Through the SMP module 244, a subscriber 224 may define system rules as well as exclusions to those rules for instances when prices of certain of the SOIs are missing or have become stale.

The modules 236, 238, 240, 242, 244 described thus far can be used to define the rules controlling data or information compilation and processing for generating each subscriber's golden copy. The pricing system 100 further includes modules that regulate the operation and auditing of the reports generated. More specifically, a dashboard module 246 allows the subscriber 224 to view, in real time, the status of the golden copy generation process. Thus, by selecting an appropriate command, the subscriber may view the then current state of the information collection or processing procedure. Additionally, the subscriber 224 may select an appropriate command to view any exceptions that may have been generated during the process.

At any time, a subscriber accessing the information management interface 202 may audit the current and past golden copies generated via a history module 248, and may additionally view and/or change the time and frequency of the automated generation of golden copies via a scheduling module 250. Further, action logs that are continuously created and updated by the system can be cast into reports with proper formatting and accessed by the subscriber by selecting one of many possible pre-formatted reports from a reporting module 252. Examples of pre-formatted reports include a control report, which can aggregate information on information uploads and changes performed by the subscriber, a price feed report, which can identify which sources of information were used when collecting data, a regulatory report, which can be customized to provide required regulatory reporting information, an SMP report, and any other report that can be customized to display information relative to the pricing system 100.

In the illustrated embodiment, the functionality of the pricing system 100 described thus far can be accomplished by execution of various computer executable commands. These commands are arranged to selectively provide the various modular functions described relative to the information management interface 202 as shown in FIG. 2, as well as other operations that relative to data retrieval, storage, security, integrity, and others as described in further detail below. The computer executable instructions can be organized into functional fields to facilitate system operation, system maintenance, and future updates.

Figure 4:
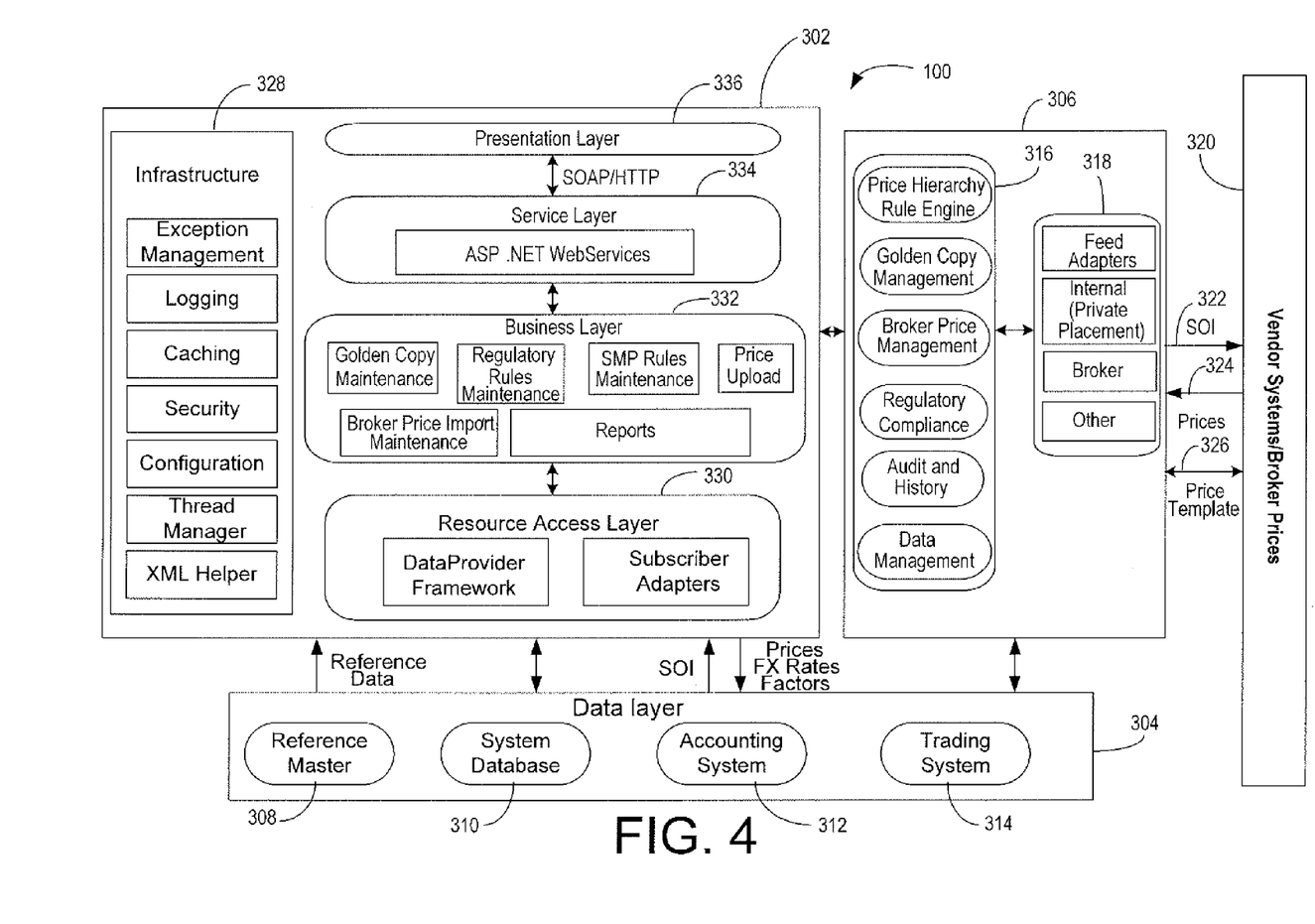
FIG. 4 is a functional schematic of an embodiment of a computer-implemented system for compiling golden copy securities pricing.

A functional schematic of the pricing system 100 is shown in FIG. 4. Consistent with the above description, the pricing system 100 includes a command processing field 302 that exchanges information with a data storage and retrieval field or data layer 304 and a user interface field 306. The data layer 304 in the illustrated embodiment is an organized collection of data that can store and retrieve information. For example, the data layer 304 may reside within the databases 120, 204 as shown in FIGS. 1 and 3, respectively. The data layer 304 may include dedicated sub-collections of data, such as a reference data master 308 that contains asset classification and price history information, a system database 310 that contains user credentials and other operating parameter information, an accounting system 312 that contains financial information, a trading system 314 that contains information on ongoing trading activity and pending transactions, and other systems (not shown).

The data layer 304 is accessible by subscribers via the user interface field 306 for uploading data, such as the subscriber lists of SOIs, new or revised access credentials for use when accessing the system, and other data exchange that is specific to each subscriber. The information entered into the pricing system 100 and returned therefrom to each subscriber through the user interface field 306 is structured in accordance with the diagram and related description provided above relative to FIG. 3. Thus, the user interface field 306 includes subsets of computer executable instructions arranged to effect user commands that are selected through the information management interface 202 (FIG. 3). Each of these subsets may have a dedicated function, for example, setting the price hierarchy rules, managing present and past golden copies, managing broker prices, tracking regulatory compliance information, auditing and providing transactional history, managing data, and others. These subsets are presented collectively in FIG. 4 as a user command execution field 316 that is included within the user interface field 306.

The user interface field 306 further includes a communication systems interface 318 for facilitating the electronic communication for exchanging information between the pricing system 100 and external sources, such as vendor or broker electronic systems 320. Information thus exchanged can include the transmission of lists of the SOIs 322 provided by the subscribers to the vendors and brokers, the transmission of the requested pricing information 324 back into the user interface field 306, and other information, such as templates or other formatting 326 that can be used to organize the information that is being exchanged.

The command processing field 302 includes numerous functions that process and present the desired information to the users while maintaining data security and integrity. In this way, the command processing field 302 includes a system infrastructure module 328 that manages the various operations of the computer system, for example, the interface between the application 122 with the database 120 while operating on the server 118, as shown in FIG. 1. Thus, the system infrastructure module 328 may include appropriate algorithms that are tasked to manage system exceptions, log system activity, manage system cache memory, perform system security tasks, maintain system configuration information, manage computer processing threads, provide extensible markup language (XML) support to other processes, and other operations.

After the appropriate information has been provided by the subscribers, the command processing field 302 is configured to execute computer instructions that will produce a golden copy in accordance with the specifications set by each subscriber. To this end, the command processing field has read and write access to the data layer 304 such that the specific lists of SOIs and other reference data is made available to the command processing field 302, while pricing information and other data provided to the command processing field 302 by external sources can be archived and retrieved. The execution of instructions within the command processing field 302 conceptually occurs on multiple processing layers, each of which builds on a previous layer to ultimately accomplish the task of compiling a golden copy that accords with the requirements of each subscriber.

More specifically, the command processing field 302 includes a resource access layer 330 that brings together the framework of information input into the pricing system from vendors and brokers (external information) with various subscriber adapters that permit access to and retrieval of subscriber-specific information from the data layer 304 (internal information). With the internal and external information access established at the resource access layer 330, a business layer 332 performs the required information gathering and processing. The business layer 332 maintains present and past golden copies, as well as maintaining pricing rules as well as SMP rules set by the subscribers. The business layer 332 additionally compiles a master list of all SOIs provided by all subscribers for each vendor and broker, and transmits these master lists to the information sources. After the master lists have been populated with the requested prices, the business layer 332 imports the completed master lists and begins distributing the pricing information into the individual golden copy reports.

When distributing the received pricing information and creating each individual golden copy report, the business layer 332 retrieves the specific rules defined by each subscriber, and begins populating each report in a sequential fashion as it goes down the list of SOIs. When populating each of the entries for the SOIs, the business layer 332 first interrogates the data layer 304 to determine which class of asset is represented by each entry. After the type of asset has been determined, the business layer 332 then checks the appropriate rule defined for that class of asset to ascertain the desired hierarchy of information sources specified for that asset class. With the source determined, the business layer 332 accesses the master list for the first identified information source to retrieve the pricing information provided, and populates that specific entry on the golden copy with the price thus retrieved. In the event the price on the master list for that particular information source is blank or deemed unreliable, the entry is flagged in the exception report and the business layer 332 attempts to retrieve a price from the second choice of information source according to the rules. This process continues until all entries on all reports have been populated with pricing information or have been at least flagged on the exception report.

The golden copy reports compiled in the business layer 332 are provided in an appropriate format to a service layer 334. The service layer 334 includes a network application framework, for example, the Active Server Pages network framework (ASP.NET) available from the Microsoft Corporation. During operation, the information received from the business layer 332 is formatted for viewing and for electronic dissemination to the subscribers in the service layer 334. The formatted information from the service layer 334 is finally provided in a viewable and downloadable form to a presentation layer 336 by use of one or more appropriate protocol specifications for exchanging structured information in the implementation of network services in computer networks. One example of such a service is the Simple Object Access Protocol (SOAP), which relies on XML as its message format, and usually relies on other protocols, for example, the hypertext transfer protocol (HTTP) for message negotiation and transmission.

Figure 5:
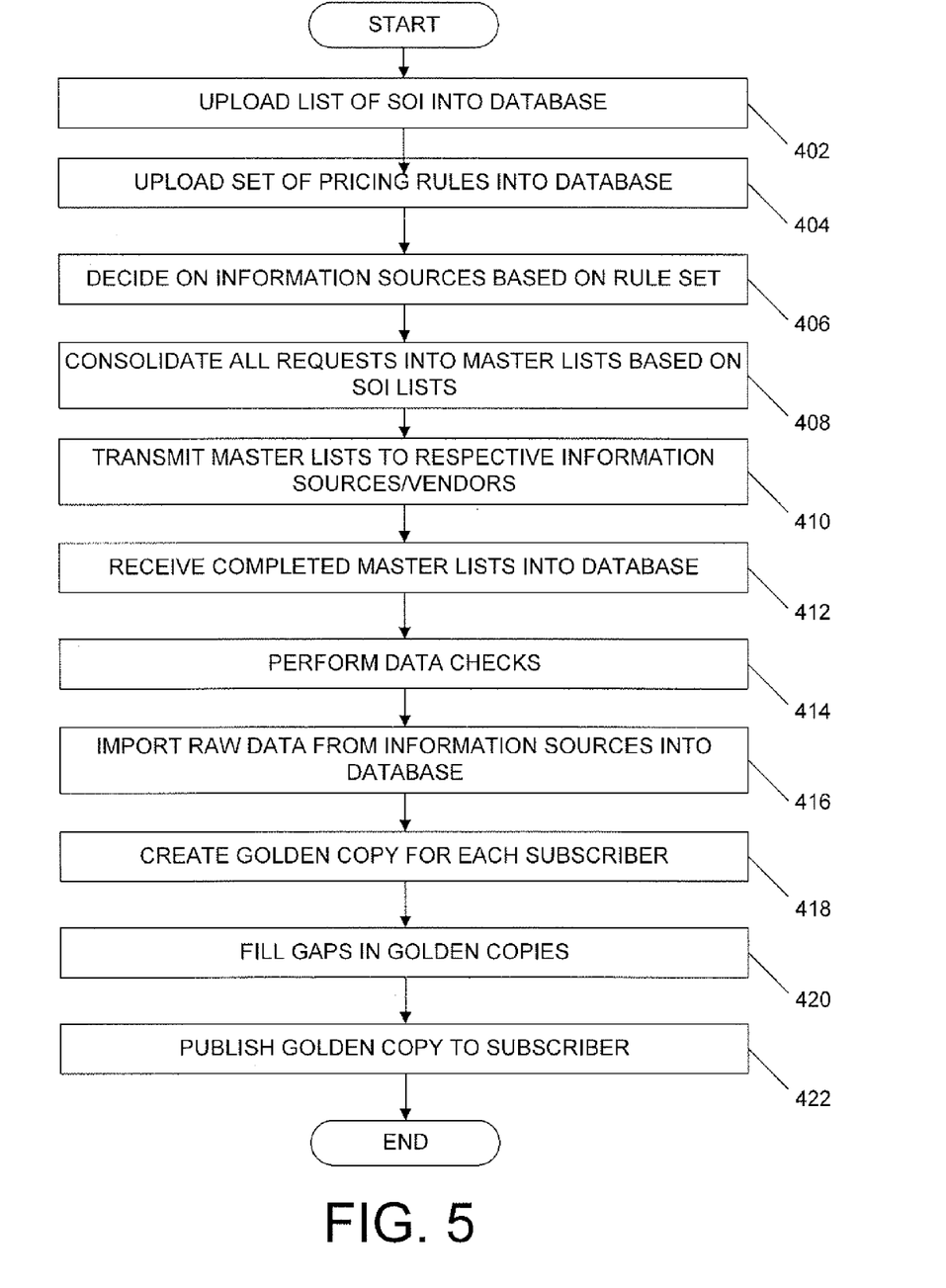
FIG. 5 is a flowchart illustrating steps of an embodiment of a computer-implemented method for compiling golden copy securities pricing.

A flowchart for a method of automatically compiling customized golden copy reports for subscribers in accordance with their particular pricing rules and specifications is shown in the flowchart of FIG. 5. In pertinent part, the process of compiling golden copies begins at 402 where various subscribers or users of the pricing system upload their lists of SOIs into a database. These lists of SOIs may be uploaded on a regular basis, for example, daily, or may reside on the database on a permanent basis and be updated periodically as changes in the holdings of the users occur.

Each subscriber may define and upload into the system specific set of rules that will govern the compilation of that subscriber's golden copy at 404. These rules mainly dictate the desired sources of information, which are placed in order of importance, that the system will use depending on the type of asset represented by each item on the list of SOIs provided by the subscriber. Additional rules may also be input at 404 to define how the subscriber wishes the system to handle exceptions, missing or stale prices, regulatory compliance reporting, and other aspects of the subscriber's business. As with the lists of SOIs, the rules defined by the subscribers may remain onto the system and be updated as necessary by the subscribers that created them, or may alternatively be redefined anew on a periodic basis.

After a list of SOIs and a rule set have been entered into the pricing system, the system can interrogate all pricing rules to determine, in the aggregate, which sources of information have been identified at 406, and compile master lists of securities at 408 that correspond to each of the identified information sources. For example, if two sources are identified for a particular security in the rules provided by a subscriber, the system can populate the master list corresponding to each of the two sources with that particular security. This redundancy is put into place to avoid the delay in preparing the golden copy associated with having to place a new request to the second source of information in the event the first source of information is unable to provide a price for that security.

The master list corresponding to each vendor or information source is transmitted to that vendor at 410 electronically, for example, by use of the communication channels 116 shown in FIG. 1. Although the master list transmitted to each vendor contains a single line item representing each security for which pricing is desired, any particular line item may represent a security that was listed in more than one list of SOIs provided by the subscribers. Accordingly, for billing purposes, each master list may include or be accompanied by a billing report, which includes information indicative of how many requests are represented in the aggregate by each master list as well as for which subscribers. In this way, the information vendor may appropriately charge the accounts of the requesting subscribers for the pricing information provided.

Having received their corresponding master lists, the vendors or other information sources populate the lists with the requested pricing information, and return them to the service provider via electronic transmission. The service provider receives these reports from the various sources and stores them in a database for further processing at 412. One processing step performed on the information received is a check of the data at 414. This check may be automatically performed by the system to ensure that the data received from the various sources is in the appropriate format for importation into the database and for further processing by the system. Additional checks may be performed, such as checking for missing prices, performing rationality checks on the prices received, and so forth. These checks are intended to ensure the quality of the data before use in the creation of golden copies for the subscribers. For instance, a missing price may be flagged for manual input or be excluded from the report generation process. Further, a rationality check may compare the price for each security with a past price, and flag any items that diverge from a past or other historical value for that same security for manual confirmation. Following the optional data integrity checks at 414, the raw data from all the populated master lists received is imported into the database as raw data at 416.

The raw data entering the database includes information sets for each security. Each information set includes the security identifier and asset class, as well as the received price and the source of that pricing. Although each information set may include additional information, the collection entering the database serves as a data repository from which each subscriber's golden copy is automatically generated by the pricing system based on that subscriber's specific rules.

The pricing system creates a golden copy for each subscriber by retrieving information from the database at 418 in accordance with the rules and the lists of SOIs previously defined by the subscribers at 402 and 404. More specifically, when compiling the golden copy for a particular subscriber, the pricing system examines each of the line items included in that subscriber's list of SOIs and populates the corresponding price. The selection of the appropriate price to include on the list depends on the various rules defined by that subscriber. Hence, when examining a particular security, the system first looks up and retrieves an asset classification for that security. Then, the system refers to the pricing rules of that subscriber to determine which information source for that particular class of asset is listed. Having the particular security and source identified, the system accesses the database to retrieve the appropriate raw data entry, which was previously provided for the particular security on the particular populated master list provided by the particular subscriber. In the event the price is unavailable or otherwise unusable, the system either repeats this process for the next source listed in the particular subscriber's rules for the asset class of the security, or if no additional sources are identified, flags the entry for manual examination.

The process for populating the price under the corresponding rules defined by each subscriber is repeated for each security listed in the subscriber's SOIs until the golden copy is complete. The entire process is repeated for each golden copy that will be generated by the system. The golden copies thus generated, along with any exception reports, may optionally be manually approved and the various gaps or missing values checked and filled in, if desired, at 420. Thereafter, the golden copies are published or otherwise provided or made available for download to their corresponding subscribers at 422. In the illustrated embodiment, a notification that each subscriber's golden copy is complete is sent electronically to the subscribers. The subscribers can access the system and download their golden copy at 422 as well as any other type of reports that each subscriber may have specified.

In other embodiments, systems and methods for compiling securities pricing information may be implemented on various types of computer architectures, such as for example on a single general purpose computer or workstation, or on a networked system, or in a client-server configuration, or in an application service provider configuration. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality (e.g., the golden copy security pricing compilation functionality) may be located on a single computer or distributed across multiple computers depending upon the particular circumstances surrounding its use (e.g., located on client and/or server computers).

In various embodiments, methods for compiling securities pricing information in accordance with the principles of the present disclosure operate as software programs running on a computer processor. Dedicated hardware implementations including, but not limited to, application-specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

In various embodiments, a program for compiling securities pricing information in accordance with the principles of the present disclosure can take the form of a computer program product on a tangible, computer-readable storage medium having computer-readable program code means embodied in the storage medium. The software implementations of the program for compiling securities pricing information as described herein can be stored on any suitable tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, a tangible storage medium includes a distribution medium and art-recognized equivalents and successor media, in which the software implementations herein are stored.

The present invention has been described in particular detail with respect to a limited number of embodiments. Those of skill in the art will appreciate that the invention may additionally be practiced in other embodiments. The particular naming of the components, capitalization of terms, the attributes, data structures, or any other programming or structural aspect is not mandatory, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by real time network operating systems.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. It should be understood that a variety of programming languages may be used to implement the teachings of the present disclosure as described herein, and any references to specific languages are exemplary to aid one skilled in the art to make and use the invention.

The language used in the specification has been principally selected for readability and instructional purposes. Accordingly, the disclosure is intended to be illustrative, but not limiting, of the scope of the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for compiling securities pricing information comprising:
   a physical computer-readable medium including a securities pricing application having computer-executable instructions for compiling securities pricing information;
   a securities pricing processor adapted to execute the instructions for compiling securities pricing information contained on the physical computer-readable medium; and
   a data storage device, the data storage device containing securities pricing information, the data storage device operably arranged with the securities pricing processor such that the securities pricing information in the data storage device is accessible to the securities pricing processor and is modifiable by the securities pricing processor;
   wherein the securities pricing application includes:
      a subscriber securities list module adapted to receive from a subscriber a list of securities of interest;
      a subscriber rule set module adapted to receive from the subscriber a rule set including at least one pricing rule relating to the securities of interest;
      a security pricing collection module adapted to collect security pricing information using an information management interface operably connected to a security pricing information source;
      a security pricing storage module adapted to store the security pricing information in the data storage device; and
      a security pricing report compilation module adapted to compile from the security pricing information a pricing report for the list of securities using the rule set from the subscriber.

2. The system of claim 1, further comprising:
   an output device operably arranged with the securities pricing processor, and the output device adapted to provide a user with a visually-perceptible display of the pricing report.

3. The system of claim 1, further comprising:
   a communication channel interconnecting the securities pricing processor with a subscriber computer system, the communication channel adapted to electronically communicate the pricing report for the list of securities to the subscriber.

4. The system of claim 3, wherein the communication channel interconnecting the securities pricing processor and the subscriber computer system includes a web server operatively connected to the securities pricing processor, the web server operatively connected to an external network to provide access to an internet-based web platform.

5. The system of claim 4, wherein the internet-based web platform provides a plurality of authorized subscribers with access to the securities pricing application to enter subscriber securities lists and subscriber pricing rules maintained by the securities pricing application in the data storage device.

6. The system of claim 5, wherein the computer-executable instructions for compiling securities pricing information, when executing on the securities processing processor, perform the steps of:
   receiving, from a second subscriber, a second list of securities of interest;
   receiving, from the second subscriber, a second rule set including at least one pricing rule relating to the securities of interest in the second list; and
   compiling, from the security pricing information, a second pricing report for the second list of securities and using the second rule set from the second subscriber.

7. The system of claim 1, further comprising:
   a communication channel interconnecting the information management interface to the security pricing information source to provide a security pricing data feed from the security pricing information source to the securities pricing application.

8. The system of claim 7, wherein the communication channel interconnects the information management interface to a second security pricing information source to provide a second security pricing data feed from the second security pricing information source to the securities pricing application.

9. The system of claim 8, wherein the rule set includes a pricing rule designating an information source hierarchy for a security of interest such that the pricing report is compiled with pricing information received from the first information source and the second information source according to the information source hierarchy in the pricing rule.

10. The system of claim 1, wherein the securities pricing application includes an exception report module adapted to generate a listing of any security pricing information missing from the security pricing report but found in the list of securities or specified in the rule set from the subscriber.

11. A method for compiling securities pricing information comprising:
operably arranging a processor with a data storage device and a communication channel;
employing the processor executing computer executable instructions stored on a tangible computer-readable medium to implement steps including:
receiving from a subscriber a list of securities of interest;
receiving from the subscriber a rule set including at least one pricing rule relating to the securities of interest;
collecting security pricing information through the communication channel from a security pricing data feed of a security pricing information source;
storing in the data storage device security pricing information from the security pricing data feed; and
compiling from the security pricing information a pricing report for the list of securities using the rule set from the subscriber.

12. The method of claim 11, wherein the computer executable instructions stored on the tangible computer-readable medium performs a further step of:
providing a visually-perceptible display of the pricing report through an output device operably arranged with the processor.

13. The method of claim 11, further comprising:
electronically communicating the pricing report for the list of securities to the subscriber over a communication channel interconnecting the processor with a subscriber computer system.

14. The method of claim 11, wherein the computer executable instructions stored on the tangible computer-readable medium implements further steps including:
receiving, from a second subscriber, a second list of securities of interest;
receiving, from the second subscriber, a second rule set including at least one pricing rule relating to the securities of interest in the second list; and
compiling, from the security pricing information, a second pricing report for the second list of securities using the second rule set from the second subscriber.

15. The method of claim 11, further comprising:
collecting security pricing information through the communication channel from a second security pricing data feed of a second security pricing information source; and
storing in the data storage device security pricing information from the second security pricing data feed.

16. The method of claim 11, wherein the rule set includes a pricing rule designating an information source hierarchy for a security of interest, and wherein the pricing report is compiled with pricing information received from the first information source and the second information source according to the information source hierarchy in the pricing rule.

17. The method of claim 11, wherein the computer executable instructions stored on the tangible computer-readable medium performs a further step of:
generating an exception report containing a listing of any security pricing information missing from the security pricing report but found in the list of securities or specified in the rule set from the subscriber.

18. A tangible computer-readable storage medium storing a program for compiling securities pricing information that, when executing on one or more computing devices, performs the steps of:
receiving from a subscriber a list of securities of interest;
receiving from the subscriber a rule set including at least one pricing rule relating to the securities of interest;
collecting security pricing information from a security pricing data feed of a security pricing information source;
storing in a data storage device security pricing information from the security pricing data feed; and
compiling from the security pricing information a pricing report for the list of securities using the rule set from the subscriber.

19. The computer-readable storage medium of claim 18, wherein the program for compiling securities pricing information, when executing on one or more computing devices, cause the one or more computing devices to perform the step of:
providing a visually-perceptible display of the pricing report through an output device operably arranged with the one or more computing devices.

20. The computer-readable storage medium of claim 18, wherein the program for compiling securities pricing information, when executing on one or more computing devices, cause the one or more computing devices to perform the step of:
electronically communicating the pricing report for the list of securities to the subscriber.

21. The computer-readable storage medium of claim 18, wherein the program for compiling securities pricing information, when executing on one or more computing devices, cause the one or more computing devices to perform the steps of:
receiving, from a second subscriber, a second list of securities of interest;
receiving, from the second subscriber, a second rule set including at least one pricing rule relating to the securities of interest in the second list; and
compiling, from the security pricing information, a second pricing report for the second list of securities using the second rule set from the second subscriber.

22. The computer-readable storage medium of claim 18, wherein the program for compiling securities pricing information, when executing on one or more computing devices, cause the one or more computing devices to perform the steps of:
collecting security pricing information from a second security pricing data feed of a second security pricing information source; and
storing in the data storage device security pricing information from the second security pricing data feed.

23. The computer-readable storage medium of claim 22, wherein the rule set includes a pricing rule designating an information source hierarchy for a security of interest, and wherein the pricing report is compiled with pricing information received from the first information source and the second information source according to the information source hierarchy in the pricing rule.

24. The computer-readable storage medium of claim 18, wherein the program for compiling securities pricing information, when executing on one or more computing devices, cause the one or more computing devices to perform the step of:

generating an exception report containing a listing of any security pricing information missing from the security pricing report but found in the list of securities or specified in the rule set from the subscriber.

* * * * *